(No Model.) 4 Sheets—Sheet 1.
S. R. DRESSER.
PIPE COUPLING.
No. 381,916. Patented May 1, 1888.
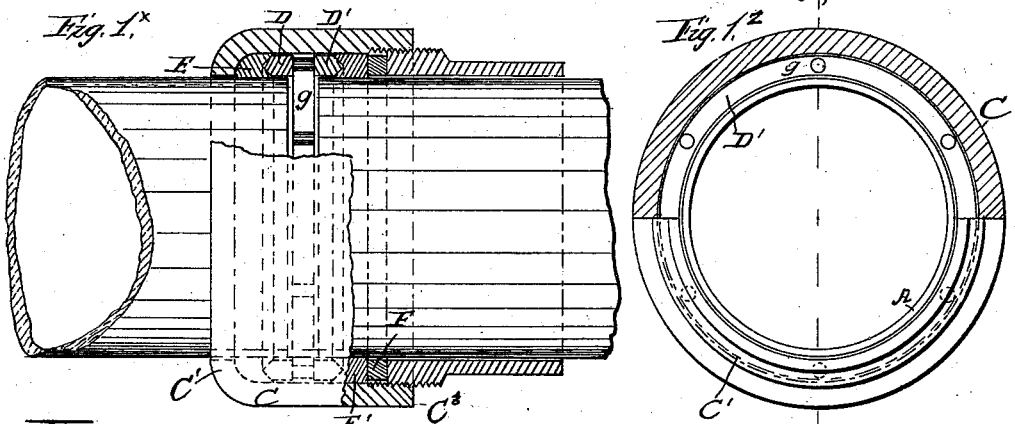
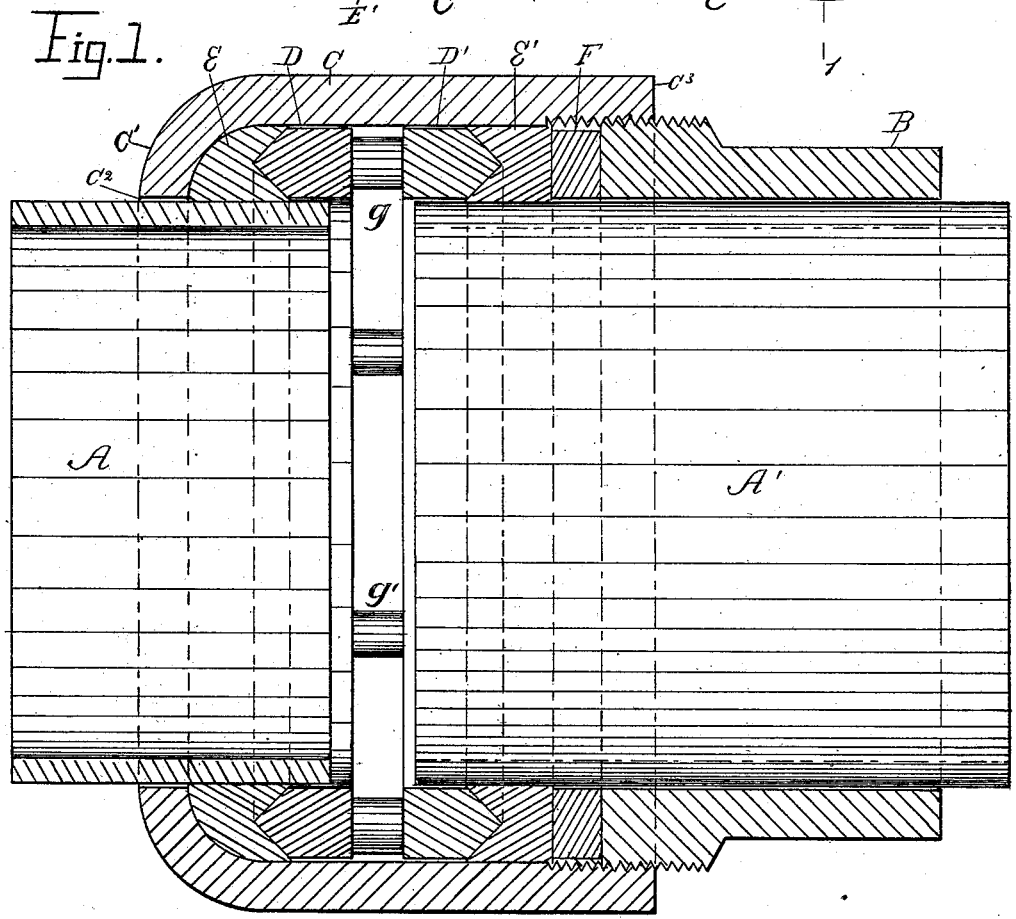
Witnesses.
R. C. Howland,
F. C. Cousins.
Inventor-
Solomon R. Dresser.

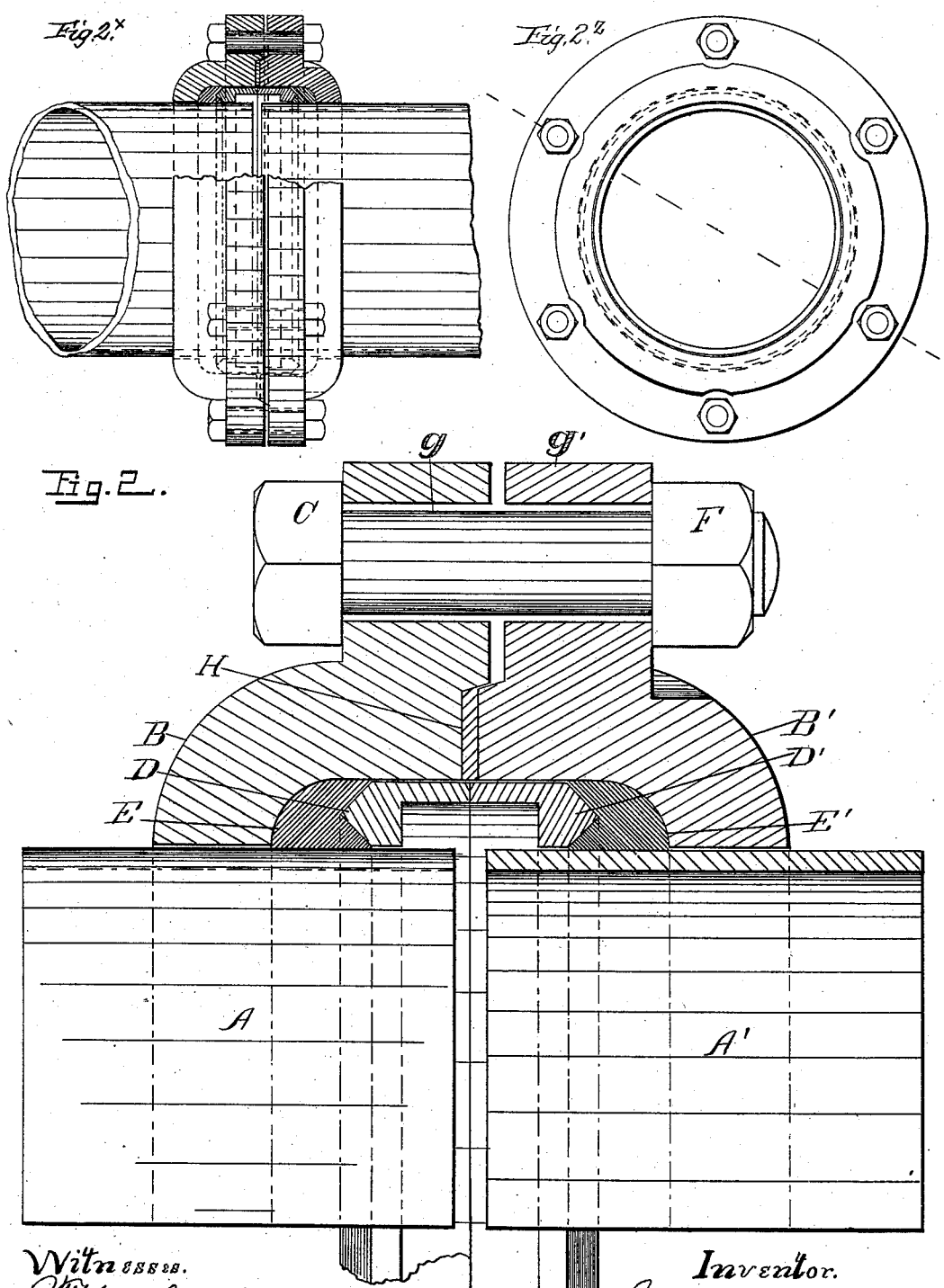

(No Model.) 4 Sheets—Sheet 3.
S. R. DRESSER.
PIPE COUPLING.
No. 381,916. Patented May 1, 1888.
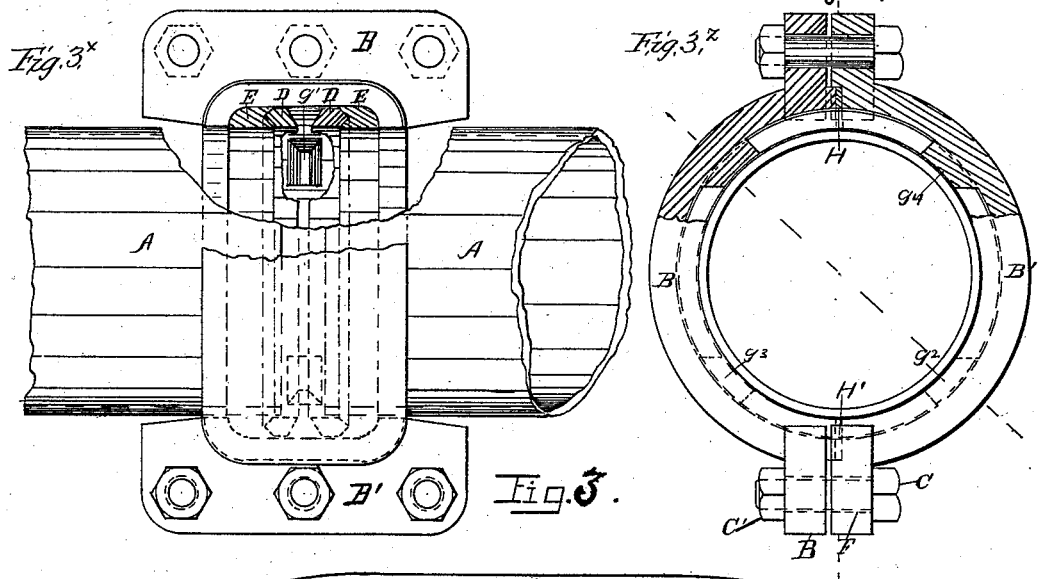
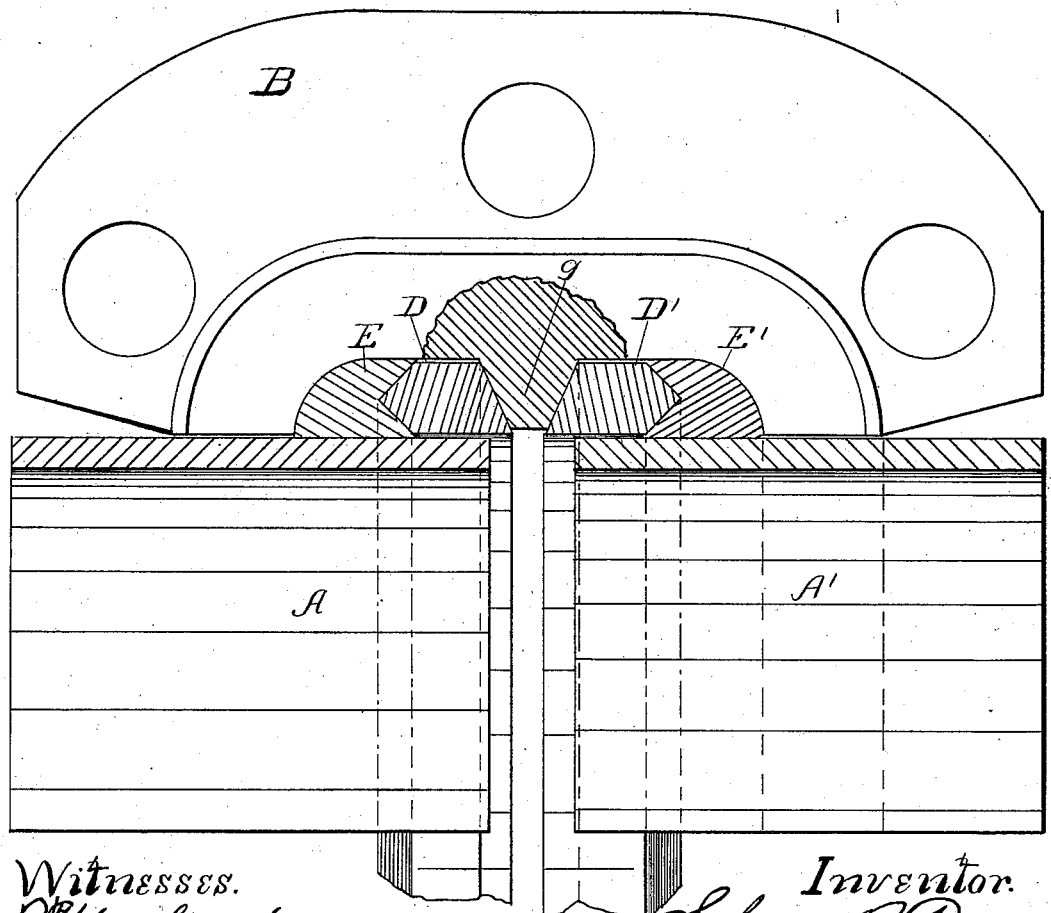
Witnesses.
R. E. Howland,
A. C. Cousins
Inventor.
Solomon R. Dresser.

(No Model.) 4 Sheets—Sheet 4.
S. R. DRESSER.
PIPE COUPLING.
No. 381,916. Patented May 1, 1888.
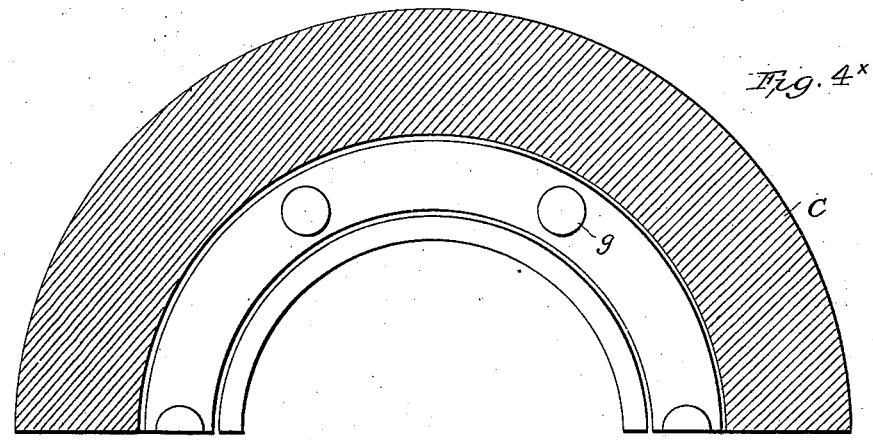
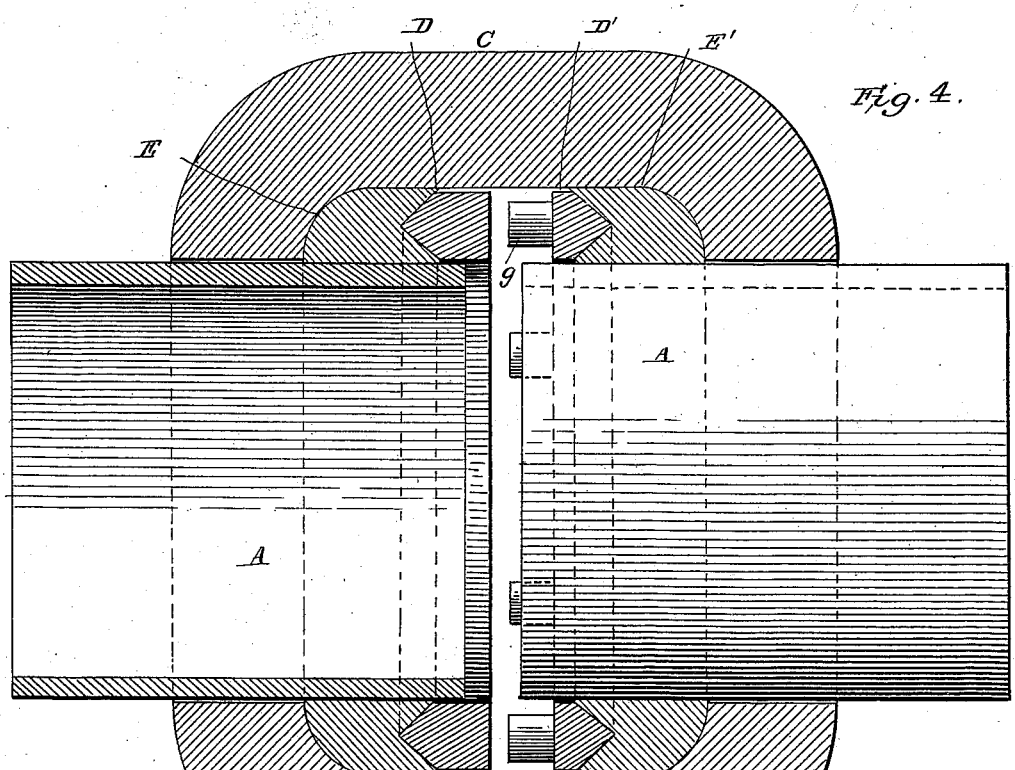
WITNESSES:
Edwin T. Yewell
Ledru R. Miller
INVENTOR.
Solomon R. Dresser,
per J Hallock & Halleck
Attorneys

UNITED STATES PATENT OFFICE.

SOLOMON R. DRESSER, OF BRADFORD, PENNSYLVANIA.

PIPE-COUPLING.

SPECIFICATION forming part of Letters Patent No. 381,916, dated May 1, 1888.

Application filed February 26, 1887. Serial No. 229,030. (No model.)

*To all whom it may concern:*

Be it known that I, SOLOMON R. DRESSER, a citizen of the United States, residing at Bradford, in the county of McKean and State of Pennsylvania, have invented certain new and useful Improvements in Pipe-Couplings; and I do hereby declare the following to be a full, clear, and exact description of the invention, such as will enable others skilled in the art to which it appertains to make and use the same.

The object of my invention is to provide a self-packing coupling for the ends of tubes or pipes and to utilize the pressure of the material conveyed in the pipes, as well as mechanical means to compress the packing in the coupling.

The accompanying drawings show the invention and the different ways of applying it to different pipes and different forms of coupling.

Figure 1 represents a longitudinal section of one form of my device; Fig. 1$^x$, a side elevation with sleeve partly broken away; Fig. 1$^z$, an end view partly in section and partly in elevation; Fig. 2, a longitudinal section showing the upper part of the device; Fig. 2$^x$, a side elevation partly in section; Fig. 2$^z$, an end elevation; Fig. 3, a view showing the pipes in longitudinal section and the coupling in elevation with parts broken away; Fig. 3$^x$, a side elevation with parts broken away; Fig. 3$^z$, an end elevation with parts broken away; Fig. 4, a longitudinal section, and Fig. 4$^x$ a section of one half of the sleeve.

In all the figures A and A' represent the pipe to be joined.

D and D' represent the loose rings.

E and E' represent the packing-rings, generally made of rubber; but asbestus, hemp, or any fibrous or elastic material may be used.

Fig. 1 is a sectional view of my invention applied to ordinary wrought-iron steam, gas, or oil pipe with a screw-threaded gland.

C is a sleeve, made larger than the pipe, having an interior lip, $c'$, pierced with an aperture, $c^2$, through which one end of the pipe is introduced. The sleeve C is screw-threaded at its upper end at $c^3$, and the follower or gland B screws into it.

F is a metal washer interposed between the gland B and the packing E'. When the gland B is screwed up, the packing is compressed against the pipe and the sleeve. The packing is made in two parts—one above and the other below the divisions of the pipes A and A'.

It is immaterial what shape the loose rings D and D' are made so they are provided with lugs or narrow rims to allow the gas or other material in the pipe to get between them, so that the pressure of the same may force them against the packing-rings E and E' and compress them more tightly against the sleeve and pipe.

The sleeve C, the packing-ring E, and the loose ring D are put over the end of the pipe A. The gland B, washer F, upper packing-ring, E', and the loose ring D' are put on the other pipe end, A'. The ends of the pipe are brought together and the gland B is firmly screwed into the sleeve C. The packing-rings E and E' are thus compressed between the sleeve and the pipe. When the line of pipe is completed and the gas or liquid under pressure is let into the line, it will press against the loose rings D and D' and force them against the packing E and E', compressing it still more tightly against the pipe and the sleeve, thus insuring a perfectly tight joint, as the greater the pressure the more firmly will the packing be compressed.

Fig. 2 of my invention shows the coupling made in two sections, the same as an ordinary flange union drawn together with bolts in the same manner. The sections B and B' are recessed for packing-rings E and E' and loose rings D and D'. One section of the coupling, B, the packing-ring E, and the loose ring D are put on one end of the pipe, A. The other section of the coupling, B', the packing-ring E', and the loose ring D' are put on the other pipe end, A'. Then the gasket-ring H is placed in recess of one section of coupling. The pipe ends are placed together and in line with each other. Then the two sections of coupling are slipped together, the bolts are put in, and the nuts are put on. When the nuts are screwed up, the two sections of coupling are drawn together, and this forces the loose rings D and D' against the packing-rings E and E', compressing them tightly against the pipe and the inside of coupling, at the same time tightening the gasket-ring H between the sections of coupling. The loose rings D and D' either have narrow rims or lugs on them, so as to make space between them to allow the gas or liquid in the pipe to get between and force them apart, thus utilizing the pressure of the gas or liquid conveyed in the pipe to more tightly compress the packing-rings E and E' against the pipe and coupling.

Fig. 3 of my invention shows the pipe-coupling parted in two sections longitudinally, with ends to nearly fit the pipe, and the center recessed out large enough to put in packing-rings E and E' and loose rings D and D'. The loose rings D and D' have tapering places in them, so that lugs G, which are cast on the inside sections of coupling, will just enter. When the two sections are drawn together with bolts, the lugs G, which are wedge-shaped, are drawn between the loose rings D and D' and force them back against the packing-rings E and E', compressing them tightly against pipe and coupling. At the same time it tightly compresses the gasket-ring H between the two sections of coupling. In putting together this form of coupling the packing-rings E and E' and the loose rings D and D' are put over the ends of pipe A and A', respectively. Then the ends of the pipe are placed together and in line with each other. One section of coupling is placed under the pipe ends. The other section is put on top. The bolts are put through the holes of the sections and drawn together with the nuts, which forces the lugs G between the loose rings D and D', and compresses the packing-rings E and E' against the pipe and the coupling. The action of the pressure of the material conveyed in the pipe is the same as described in the other forms.

Fig. 4 shows my invention with the sleeve or coupling cast whole, with the ends to nearly fit the pipes to be joined, and the center recessed out large enough to put the packing-rings E and E' and the loose rings D and D' in before the pipe ends are forced in. The loose rings D and D' are placed in the core before the sleeve is cast. In putting the pipe together with this form the packing-rings E and E' are sprung in between the loose rings D and D' and the curved-down ends of the sleeve. The packing-rings E and E' should be thick enough so that it will require some force to insert the pipe through them, which will compress them to the sleeve and loose rings D and D'. When the gas or liquid is turned into the line of pipe, its pressure will act on the loose rings D and D', the same as fully described in above figures.

The main feature of my invention is to provide in the coupling a recess for a rubber or other elastic packing, and then to furnish and adapt means to compress such packing by means of the force or pressure of the material in the inside of the pipe, and thus force the packing into all the apertures of the joint by the pressure of the material conveyed in said pipe, thus securing a perfectly-tight and self-packing joint.

Besides securing a perfectly-tight joint the above-described means of uniting tubes or pipe makes an expansion-joint, as when the pipes expand or contract by change of temperature the pipes can slip in the packing E and E' without affecting the packing.

What I claim as my invention, and desire to secure by Letters Patent, is—

A coupling for plain-end pipes, made in two sections, recessed to put in packing-rings E and E' and loose rings D and D', in which the packing is not only compressed by mechanical means, but is also still further compressed by the pressure of the gas or liquid conveyed in the pipe acting on the loose rings, compressing the packing into all the apertures of the coupling, substantially as shown and set forth.

In testimony whereof I have affixed my signature in presence of two witnesses.

SOLOMON R. DRESSER.

Witnesses:
GEO. A. STURGEON,
C. J. STURGEON.